April 22, 1958 J. L. MOLL ET AL 2,831,786

ALLOYED CONNECTIONS TO SEMICONDUCTORS AND MANUFACTURING METHODS THEREFOR

Filed June 28, 1954

INVENTORS J. L. MOLL
C. D. THURMOND

BY D. H. Wilson, Jr.
ATTORNEY 2,831,786
Patented Apr. 22, 1958

2,831,786

ALLOYED CONNECTIONS TO SEMICONDUCTORS AND MANUFACTURING METHODS THEREFOR

John L. Moll, New Providence, and Carl D. Thurmond, Morristown, N. J., assignors to Bell Telephone Laboratories, Incorporated, New York, N. Y., a corporation of New York Application June 28, 1954, Serial No. 439,744

11 Claims. (Cl. 148—1.5)

This invention relates to semiconductive translating devices and more particularly to alloyed connections to solid semiconductive bodies and to methods of forming such connections.

Heretofore alloyed connections have been made to silicon and germanium semiconductive devices with gold, as for example in accordance with the teachings of W. G. Pfann in his applications Serial No. 184,869, now United States Patent 2,792,538, and Serial No. 184,870, both filed September 14, 1950, for "Semiconductive Translating Devices With Embedded Electrode" and "Semiconductor Signal Translating Devices," respectively, and W. Shockley Patent 2,654,059 of September 29, 1953. In the gold contacts of the above disclosures, it was sometimes observed that strains were developed to such an extent at the bonds as to crack the semiconductive material adjacent thereto. In order to avoid these strains it was found necessary in many instances to employ special annealing cycles, usually applied over substantial intervals. The problem of strains and cracks has also arisen in other alloyed connections such as those of aluminum, lead, antimony, and the like.

One object of this invention is to improve alloyed connections to solid semiconductors.

Another object is to facilitate the production of strain-free alloyed connections to solid semiconductors.

Another object is to avoid strains in gold alloyed connections to silicon and germanium.

In accordance with these objects, one feature of this invention resides in adding a material to the basic alloying agent of an alloyed connection to a solid semiconductor which avoids the formation of any substantial stresses in the semiconductor. Since the changes in size due to freezing and differing coefficients of expansion in the solid materials upon further cooling during the bonding operation are the principal source of stresses which induce the detrimental strains in these alloyed connections, it is desirable that the additive to the basic alloying agent have characteristics which alleviate the results attendant to the difference in expansion coefficients of the various materials. This can be accomplished when the additive results in a plastic or soft and yieldable material upon solidifying and further cooling and freezes at very low temperatures, below about 200° C. When the alloyed connection is formed of a material having these attributes, any tendency to build up stresses due to changes in the dimensions of the semiconductor are relieved even at low temperatures. One additive having these attributes, when included in a gold alloyed connection, is thallium. Thallium has little or no effect upon the electrical characteristics of the semi-conductor with which it is alloyed, and therefore is effective in modifying gold alloyed connections to semiconductors without appreciably changing the electrical characteristics thereof. Further, other additives can be included in the gold-thallium mixture in accordance with another feature of this invention to tailor the electrical characteristics of the connection and the semiconductor material adjacent thereto to desired characteristics whereby an ohmic connection or one or more rectifying junctions can be formed in the adjacent semiconductor.

While the present invention will be directed principally to a disclosure of doped and undoped strain-free gold-thallium connections to silicon, it is to be understood that similar connections having the same advantages as will be discussed, can be made to germanium and silicon-germanium alloyed semiconductor bodies. Also, it is to be understood that other softening additives may be incorporated in gold and other basic bonding materials to effect the results achieved with the above-described composition. For example, one such softening agent which may be employed with aluminum is gallium in a concentration from about 10 to about 50 weight percent of the aluminum-gallium composition, as disclosed in the copending application of D. K. Wilson entitled "Alloyed Connections to Semiconductors and Manufacturing Methods Therefor," Serial No. 439,580, filed June 28, 1954. This plastic constituent also has a very low melting point, about 30° C. for the gallium and about 200° C. for some of the aluminum-gallium compounds.

The above and other objects and features of this invention will more fully appreciated from the following detailed description when read in conjunction with the accompanying drawing wherein.

Figure 2:
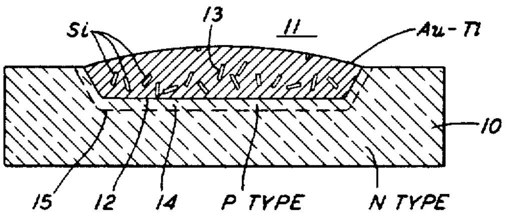
Fig. 2 is an enlarged sectioned elevation of a connection formed in accordance with this invention.

Referring now to the drawing, Fig. 2 shows an n-p junction and an alloyed connection formed in accordance with this ivention on an n conductivity type semiconductive body 10 which may be of some material such as silicon, silicon-germanium alloys, or germanium, and for the purposes of illustration in the following discussion will be considered to be silicon. The alloyed mass 11 engaging the semiconductive body at an interface 12 consists of a dispersion of semiconductive crystallites 13 in a body of thallium and gold. Adjacent to the interface, between the mass 11 and the body 10, is a region of recrystallized semiconductive material 14 which, when the alloying material is of a donor nature, is n conductivity type material having the same crystal orientation as the portion of the semiconductive body which remains solid throughout the alloying process and provides a base or matrix therefor. Thus, when the semiconductive body is of p conductivity type material, for example p conductivity type silicon, and the alloying material is a gold-thallium composition, for example a gold-thallium mixture containing from about 20 to about 50 percent by weight of thallium and including as an additive arsenic, the recrystallized region 14 is of n conductivity type silicon and an n-p junction 15 is formed intermediate the recrystallized material and the body. On the other hand, when the semiconductor is of n conductivity type material and the gold-thallium-arsenic alloying composition is alloyed thereto, the recrystallized material is high conductivity n-type and the connection thus formed has low resistance ohmic characteristics.

Figure 1:
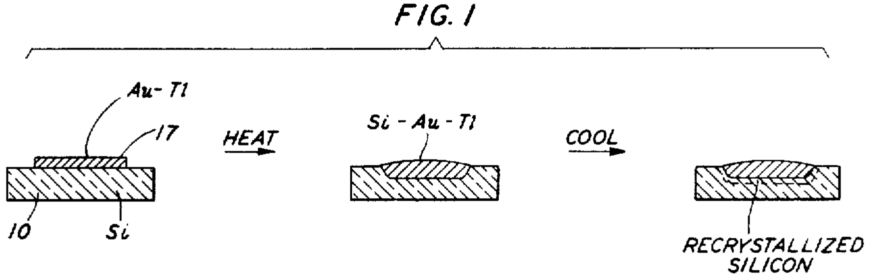
Fig. 1 is a diagram depitching the fabrication of an alloyed connection to a semi-conductor in accordance with one aspect of this invention.

The mechanical characteristics of alloyed connections containing strain-relieving additives such as thallium can be appreciated from a consideration of the physical makeup of the alloyed mass 11 and the steps in its formation. As shown in Fig. 1, the alloyed connections can be formed by mounting a body 17 of a suitable alloying composition against the surface of a semi-conductive wafer 10, preferably one that has been cleaned as by conventional etching techniques. The combination, at least in the vicinity of the interface between the elements, is heated to fuse the elements and to cause the semiconductor to enter into solution with the alloying agents. During the heating cycle the semiconductor tends to enter the molten alloying constituents at a rate which depends upon the concentration gradient and diffusion rate of the semiconductor material therein in the region adjacent the interface 12. The concentration of semiconductor material in the region adjacent to interface 12 is the saturation concentration for the temperature of the interface. The dissolution proceeds as long as the concentration of semiconductor material in the body of the melt is less than that at the interface. A mode of controlling the rate of alloying may be utilized to produce planar alloyed connections in the manner described in the above-identified D. K. Wilson application. By adjusting the concentration gradient to a low value, for example by establishing a concentration near saturation in the region of the melt adjacent the interface (at about at least 75 percent of saturation within two to five mils of the interface), the differences in the binding energies of an atom of semiconductive material to the different crystallographic faces becomes significant so that a preferred orientation for dissolution is established. Thus, as described in the D. K. Wilson application, atoms are dissolved from the crystal faces having the least binding energy, thereby revealing the crystal faces having the greatest binding energy. In germanium, silicon, and silicon-germanium alloys, these are the 111 faces.

After alloying to the desired depth, the molten material is solidified. As cooling proceeds, the concentration of semiconductive material in the molten solution reaches and then exceeds saturation. Semiconductive material precipitates from the supersaturated solution, first on the base provided by the solid semiconductive body, this precipitation being of regular crystalline form and of the same orientation as the base or matrix; and second, it nucleates in the molten mass into crystallites which are dispersed at random therethrough. At this point in the cooling the mass remains fluid and is a mixture of gold, thallium, and silicon, with crystallites dispersed therethrough. As it begins to freeze, various solid alloys of the constituents having a wide range of freezing temperatures are formed in dispersions throughout the mixture; hence, the material does not suddenly become solid, but rather becomes stiffer as the compounds having the higher freezing temperatures are frozen into the solid. Finally, at about 200° C., a eutectic of thallium and gold freezes, forming a plastic binder or matrix in which the crystallites and other solidified elements are dispersed. Thus, as the silicon freezes, all of the alloy constituents are molten and the changes in volume occurring during the freezing operation are not inhibited by any solid structure. This fluid state in the alloyed mass remains over a wide temperature range inasmuch as one or more of the constituents of the mass is fluid. Therefore, the contraction of the silicon with decreasing temperature causes the mass to flow in conforming to the changes. This flow prevents the development of detrimental stresses. Finally, when the alloyed mass drops below 200° C. the differential expansion or contraction between the mass and the silicon is taken up by the soft and yieldable gold-thallium eutectic and agani no destructive strains are created in the bond.

High quality, strain-free alloyed connections can be obtained with gold-thallium alloys ranging in composition in a weight ratio of thallium to gold of from about 1:1 to about 1:4 or from about 50 percent by weight of thallium to about 20 percent by weight of thallium. These alloys, with no additional additive, when alloyed with p conductivity type semiconductors, form a regrowth layer which is high conductivity p-type and therefore ohmic; on n conductivity type semiconductors the regrowth layer formed is also p conductivity type and therefore the connection is rectifying.

The composition of the alloy constituents can be varied to tailor the electrical characteristics of the connection formed to those which are required in the device being manufactured. Improved ohmic connections to p conductivity type materials and rectifying connections to n conductivity type materials can be produced by incorporating acceptor elements in quantities of the order of two atomic percent or less in the alloyed connection. "Acceptor materials" as used in the specification and claims designate materials which when incorporated in the semiconductor contribute to its conductivity by accepting electrons from atoms of the basic material in the filled energy band. Such an acceptance leaves a gap or hole in the filled band. By interchange of the remaining electrons in the filled band, these holes effectively move about to constitute carriers of positive charge and the material is said to be p conductivity type. These materials may be selected from the third column of the periodic table and may include boron, aluminum, gallium, and indium. "Donor material" as used in the specification and claims designates materials which when incorporated in the semiconductor contribute to the conductivity of the basic material by donating electrons to an unfilled conduction energy band in the basic material. The donated electrons in such a case constitute carriers of negative charge and the material is said to be of n conductivity type. Where it is desired to alloy a rectifying connection on p conductivity type material or an ohmic connection on n conductivity type material, small percentages, of the order of two atomic percent or less, of donor elements selected from the fifth column of the periodic table, such as phosphorus, arsenic, antimony, or bismuth can be added to the gold-thallium. Where these additives are incorporated, the recrystallized layer is n conductivity type on a p conductivity type base or matrix and high conductivity n-type on an n conductivity type base.

The limits placed upon the concentration of basic alloying constituents in these alloying compositions are set by the mechanical characteristics of the ultimate bond and by the practical considerations of the formation of the alloyed connections. Thus, where the thallium is less than about 20 percent by weight of the gold-thallium in the alloy, it is insufficient to appreciably soften the bond that is formed and the resulting connections are often strained in the same manner as has been experienced heretofore. Where greater than about 50 percent thallium is present in the gold-thallium mixture, the silicon is not sufficiently soluble in the composition to enable practical alloy bonds to be formed. Where the gold-thallium composition is applied to germanium, the upper limit by weight of thallium can be extended to about 70 percent, inasmuch as germanium is more soluble in the composition than silicon. However, again at this limit the solubility reaches such a low value that alloying is not practical.

In practice alloying may be effected by a number of techniques. All of these techniques require that the alloying material be applied to a reasonably clean surface of the semiconductive crystal and that the operation be practiced in the absence of oxygen in order to avoid the formation of thallus and silicon oxides. Accordingly, it is desirable that the environment during the alloying procedure be maintained either inert or reducing. This may be accomplished by using an atmosphere of nitrogen, helium, forming gas, or hydrogen. Wetting of the semiconductive surface by the alloy can be enhanced by applying an evaporated layer of gold to those areas of the semiconductor where alloy penetration is sought. The constituents of the alloyed connection can be incorporated into the molten mass simultaneously or separately. Where they are introduced simultaneously the alloying material may be in the form of an alloy or may be a pile-up of discrete elements of the separate constituents. Where they are applied separately a satisfactory bond will result, providing the softening thallium is added to the molten material before the gold semiconductor eutectic begins to solidify.

One technique of alloying is to perform the operation on a resistance heater, for example by forming a pile-up of the semiconductor and alloying elements on a Nichrome or rhodium strip to which the terminals of a suitable controlled source of electrical current is connected. Another method of forming the alloyed connections is to heat an assemblage consisting of members of the alloying material and the semiconductor body held in proper relationship in jigs which, for example, may be made of high purity graphite in an oven.

Alloying of gold-thallium alloys with silicon and germanium materials can be effected at temperatures between 500° C. and 800° C. The 500° C. limit is determined by the minimum temperature at which alloying will be initiated. The 800° C. limit is placed on the process by the high rate of thallium evaporation at temperatures exceeding that limit. The resulting product will include a soft, low melting temperature, continuous matrix or binder which forms a connection which is essentially free of strains. Planar alloyed connections can be formed by employing a heating cycle which establishes and maintains the concentration of semiconductive material in the molten alloy near saturation as taught in the above-noted D. K. Wilson application. One such heat treating technique is to gradually raise the temperature to the maximum alloying temperature and maintain the temperature at the maximum value for a relatively long period of time.

Another consideration in the heat treatment employed in producing these connections is that of establishing a layer of recrystallized semiconductor material intermediate the unfused semiconductive base and the alloyed mass. Semiconductive materials such as germanium and silicon recrystallize into thick layers with some difficulty from gold-thallium alloys when these alloys are permitted to cool at rapid rates. However, with slow cooling thick recrystallized layers of semiconductor can be produced, the thickness of the layer depending upon the cooling cycle employed. Thus, when the alloyed connection has reached a sufficient depth in the semiconductor, and the temperature of the molten mass is reduced, the saturation level of that mass is reduced to the point where it becomes supersaturated with the semiconductor. As the degree of supersaturation is maintained relatively slight, material will recrystallize on the solid semiconductive matrix at the interface. However, if a high degree of supersaturation is established in the material, the semiconductor will neucleate in the semiconductor mass and form crystallites therein. Accordingly, where thick recrystallized layers are sought it is desirable to maintain a slight degree of saturation over an interval sufficient for these layers to grow. This may be done by gradually cooling the molten material so that as semiconductive material is precipitated therefrom the saturation level is lowered, thereby maintaining an essentially constant degree of supersaturation.

Figure 3:
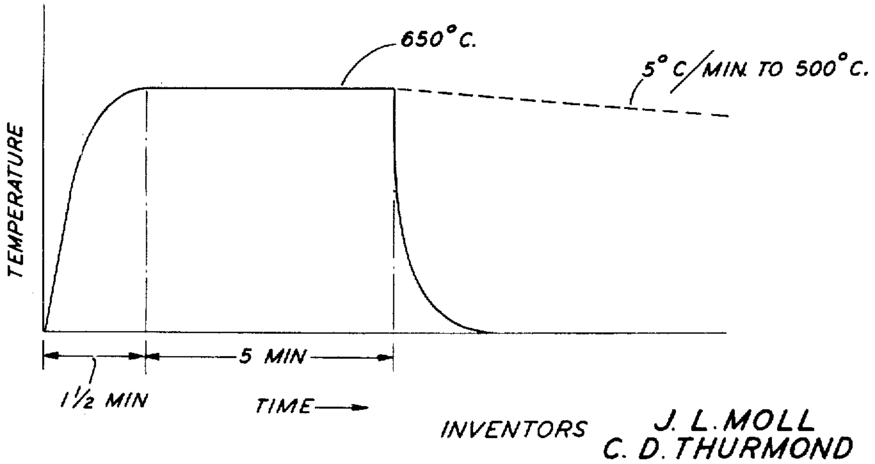
Fig. 3 discloses a heat treating cycle which may be employed to produce planar junctions in accordance with this invention, the figure comprises a plot of temperature against time for the material in the vicinity of the interface between the alloy and the semiconductor.

A specific heat treating cycle for a gold-thallium alloy bond to a single crystal silicon semiconductor is depicted in Fig. 3. This connection is formed over a large area of a 111 face which approaches parallelism with the surface from which alloying is initiated by slowly raising the temperature of a gold-thallium alloy of a composition in the range discussed above to about 650° C. in a time of one to two minutes and maintaining that temperature for about five minutes. Where only a thin regrowth layer is desired, the combination can then be permitted to cool at its natural cooling rate as shown by the solid curve in Fig. 3. Where a thicker regrowth layer is sought the molten material can be slowly cooled in the vicinity of the interface, for example at a rate of about 5° C. per minute over an interval of from at least several minutes to that required to cool to about 500° C., at which temperature it may then be permitted to cool naturally to ambient.

The bonded connections formed in accordance with this invention may be employed in the manufacture of numerous types of semiconductive translators. Electrical connections to the alloyed sections can be made with leads of the usual soldered or pressure types or can be secured to the molten alloy during the bonding operation. The devices are usually encased in housings to provide mechanical protection and to avoid deterioration of the devices due to water vapor and contaminants.

It is to be understood that the above-described arrangements and techniques are illustrative of the application of the principles of this invention. Numerous other arrangements and techniques may be devised by those skilled in the art without departing from the spirit and scope of the invention.

What is claimed is:

1. The method of forming a strain- and crack-free alloyed connection to a body comprising semiconductive material selected from the group consisting of silicon, germanium, and silicon-germanium alloys which comprises fusing a mass comprising a portion of said body and gold, incorporating thallium in said molten fused mass in a weight ratio with respect to the gold of from about 1:1 to about 1:4, and freezing said fused mass.

2. The method of forming a strain- and crack-free alloyed connection to a body comprising semiconductive material selected from the group consisting of silicon, germanium, and silicon-germanium alloys which comprises fusing a mass comprising a portion of said body and gold, at a temperature from about 500° C. to about 800° C., incorporating thallium in said molten fused mass in a weight ratio with rspect to the gold of from about 1:1 to about 1:4, and freezing said fused mass.

3. The method of forming a strain- and crack-free alloyed connection to a body comprising semiconductive material selected from the group consisting of silicon, germanium, and silicon-germanium alloys which comprises fusing a mass comprising a portion of said body and gold, at a temperature from about 500° C. to about 800° C., incorporating thallium in said molten fused mass in a weight ratio with respect to the gold of from about 1:1 to about 1:4, cooling said molten fused mass at a rate of about 5° C. per minute over an interval of at least several minutes, and freezing said fused mass.

4. The method of forming a strain- and crack-free alloyed connection having a p–n junction adjacent thereto which comprises mounting a gold-thallium alloy containing from about 20 percent to about 50 percent by weight of thallium on the surface of an n conductivity type semiconductive body, comprising material selected from the group consisting of silicon, germanium, and silicon-germanium alloys, fusing a portion of said body and said gold-thallium alloy, recrystallizing a layer of the material of the semiconductive body from the molten fused material onto said body, and freezing said fused material.

5. The method of forming an n–p junction adjacent a strain- and crack-free alloyed connection to a p conductivity type semiconductive body comprising material selected from the group consisting of silicon, germanium, and silicon-germanium alloys which comprises fusing a portion of said body with gold, incorporating a small amount of a donor material selected from the fifth column of the periodic table to the molten fused material, incorporating thallium in the molten fused material in a weight ratio with respect to the gold of from about 1:1 to about 1:4, recrystallizing semiconductive material from the molten fused material onto the semiconductive body, and freezing the fused material.

6. The method of forming an n–p junction adjacent a strain- and crack-free alloyed connection to a p conductivity type semiconductive body comprising material selected from the group consisting of silicon, germanium, and silicon-germanium alloys which comprises fusing a portion of said body with gold, incorporating a small amount of arsenic in the molten fused material, incorporating thallium in the molten fused material in a weight ratio with respect to the gold of from about 1:1 to about 1:4, recrystallizing semiconductive material from the molten fused material onto the semiconductive body, and freezing the fused material.

7. A strain- and crack-free alloyed connection to a solid semiconductive body comprising an alloy of gold, thallium, and the material of said body, said alloy engaging a portion of said body.

8. A strain- and crack-free alloyed connection to a semiconductive body comprising semiconductive material selected from the group consisting of silicon, germanium, and silicon-germanium alloys which comprises an alloy of gold, thallium, and the semiconductive material of the body wherein the weight ratio of thallium to gold is from about 1:1 to about 1:4.

9. A strain- and crack-free alloyed connection to a semiconductive body comprising semiconductive material selected from the group consisting of silicon, germanium, and silicon-germanium alloys comprising an alloy mass of gold, thallium, of the order of two atomic percent of a donor material selected from the fifth column of the periodic table, and material of the semiconductive body engaging a portion of said body.

10. A strain- and crack-free alloyed connection to a semiconductive body comprising semiconductive material selected from the group consisting of silicon, germanium, and silicon-germanium alloys comprising an alloy mass of gold, thallium, of the order of two atomic percent arsenic, and material of the semiconductive body engaging a portion of said body.

11. A strain- and crack-free alloyed connection to a semiconductive body comprising semiconductive material selected from the group consisting of silicon, germanium, and silicon-germanium alloys comprising an alloy mass of gold, thallium, materials selected from the group consisting of acceptors and donors, and material of said semiconductive body engaging a portion of said body.

References Cited in the file of this patent

UNITED STATES PATENTS

| | | |
|---|---|---|
| 2,428,992 | Ransley | Oct. 14, 1947 |
| 2,561,411 | Pfann | July 24, 1951 |
| 2,569,347 | Shockley | Sept. 25, 1951 |
| 2,701,326 | Pfann | Feb. 1, 1955 |
| 2,703,855 | Koch | Mar. 8, 1955 |
| 2,705,767 | Hall | Apr. 5, 1955 |
| 2,781,481 | Armstrong | Feb. 12, 1957 |

FOREIGN PATENTS

| | | |
|---|---|---|
| 730,123 | Great Britain | May 18, 1955 |

OTHER REFERENCES

Armstrong: Proceedings of the Institute of Radio Engrs., No. 11, vol. 40, November 1952.